No. 720,352. PATENTED FEB. 10, 1903.
A. S. HUBBARD.
SELF REGULATING SYSTEM OF ELECTRICAL DISTRIBUTION.
APPLICATION FILED SEPT. 19, 1902.
NO MODEL. 2 SHEETS—SHEET 1.
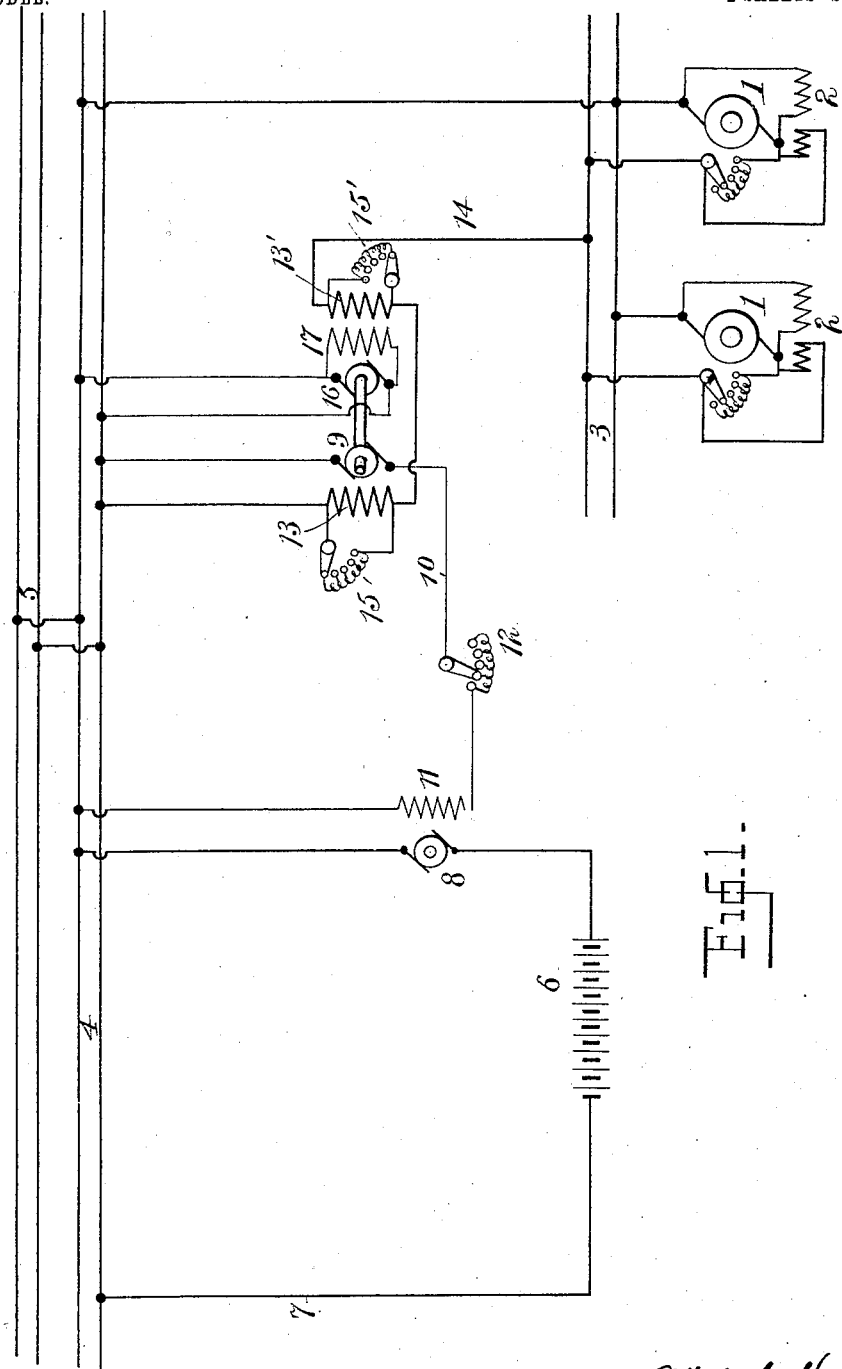

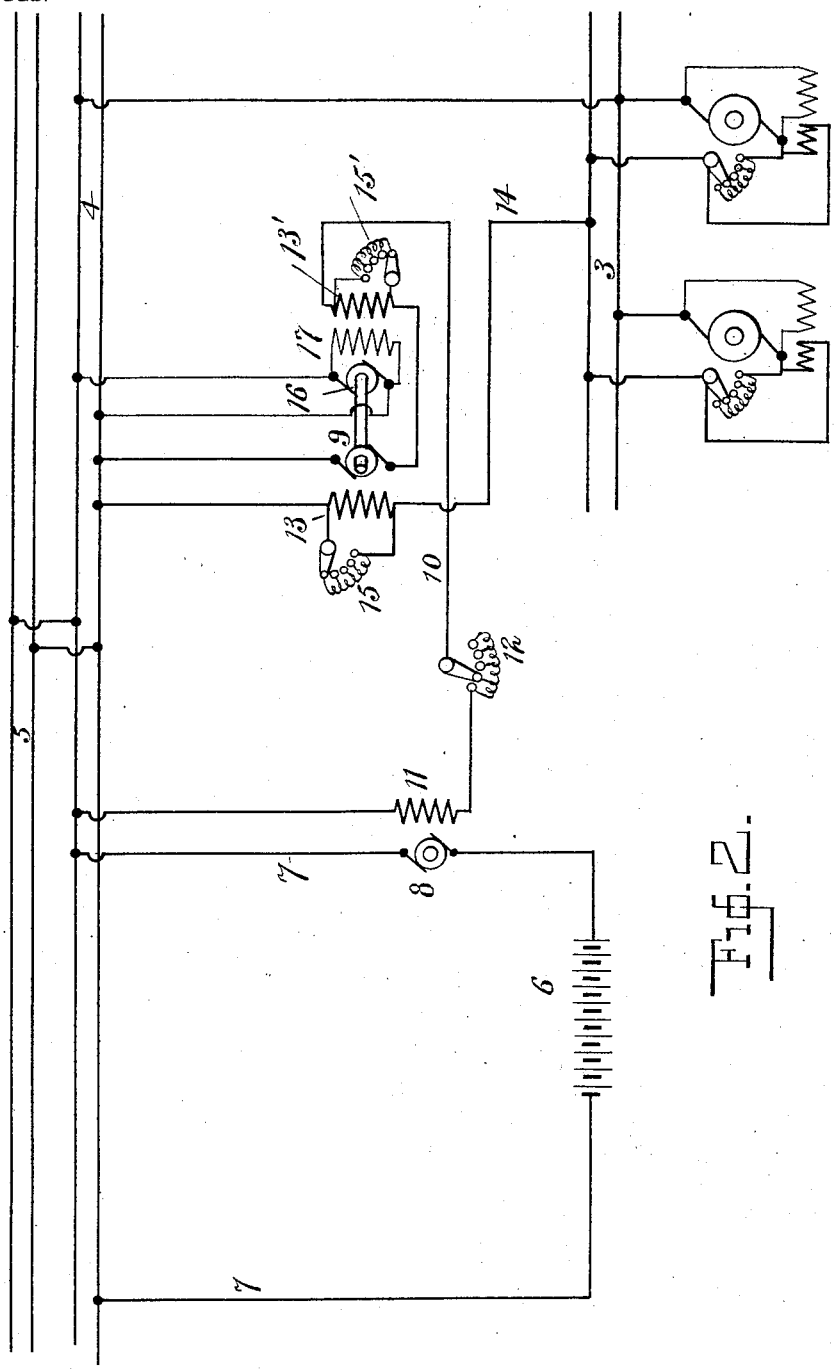

UNITED STATES PATENT OFFICE.

ALBERT S. HUBBARD, OF GREENWICH, CONNECTICUT, ASSIGNOR TO GOULD STORAGE BATTERY COMPANY, OF NEW YORK, N. Y., A CORPORATION OF WEST VIRGINIA.

SELF-REGULATING SYSTEM OF ELECTRICAL DISTRIBUTION.

SPECIFICATION forming part of Letters Patent No. 720,352, dated February 10, 1903.

Application filed September 19, 1902. Serial No. 124,112. (No model.)

*To all whom it may concern:*

Be it known that I, ALBERT S. HUBBARD, a citizen of the United States, residing at Greenwich, in the county of Fairfield and State of Connecticut, have invented a new and useful Self-Regulating System of Electrical Distribution, of which the following is a specification.

My invention relates to self-regulating systems of current-distribution in which auxiliary devices, such as storage battery and booster, are provided to respond to and take up fluctuations of the load.

My invention further relates to self-regulating systems of current - distribution in which an auxiliary source of current is provided to regulate the field of the booster, such as is illustrated and described in Letters Patent No. 673,266, issued to me.

The object of my present invention is to provide a source of power for the auxiliary source of current, which source of power shall be responsive to electrical conditions in the consumption-circuit.

My invention also comprises a system in which both the auxiliary source of current as well as the source of power for the same are responsive to electrical conditions in the consumption-circuit.

In the accompanying drawings I have illustrated diagrammatically the means I employ for accomplishing the objects above stated.

Figure 1 represents a system of distribution embodying my invention. Fig. 2 illustrates a modification thereof.

In both views of the drawings similar parts are designated by the same reference - numerals.

Referring to Fig. 1, 1 1 represent the main generators, with their fields represented at 2 2, said fields being provided with adjustable resistances, as shown. The generators are connected in parallel to bus-bars 3 3 and 4 4, the latter being connected to the consumption-circuit 5, as shown.

6 represents a storage battery connected across the bus-bars 4 4, in the circuit 7 of which is included the booster-armature 8. The auxiliary generator 9 is provided, with its armature connected across the bus-bars 4 4, as shown. In the armature-circuit 10 of this auxiliary generator is booster field-coil 11 and an adjustable resistance 12. The field-coil for the auxiliary generator or exciter 9 is shown at 13, and this exciter field-coil is connected in series with the main generators by connection 14. In the same connection 14 is a motor field-coil 13', also in series with the main generators. Each of the coils 13 13' is provided with a regulating resistance 15 15', respectively.

16 represents a motor which has driving connection with the armature of the auxiliary generator or exciter 9. As shown in the drawings, this driving connection is direct, making the generator 9 and motor 16 a single unit as a motor-generator; but it will be understood that any suitable driving connection—as, for instance, by belt—may be employed to connect the motor 16 with the generator 9. Said motor 16 is connected across the bus-bars 4 4, as shown, and is provided with a shunt field-winding 17. The motor field-windings 17 13' are wound differentially with respect to each other.

With the above system under normal conditions the main generators 1 1 are adjusted to supply current for the average conditions of load in the consumption-circuit 5. Motor field-coil 13' and exciter field-coil 13 are in series between the main generators and the load. Exciter 9 is arranged under normal conditions to give a voltage exactly equal and opposite to that of the bus-bars. Under these conditions no current flows in the booster-field 11, and consequently the booster-armature 8 generates no electromotive force and the battery neither charges or discharges. The field-windings 17 13' of the motor 16 are balanced differentially, as above described, so that the motor runs at a speed sufficient to give an electromotive force to the exciter-armature equal and opposite to that of the bus-bars. Upon an increase of load in the consumption - circuit an increased current flows through field-coils 13 13', which, as above stated, are in series with the main generators. This increase of current in the motor and exciter field-coils results in an increase of field strength, and consequently an increase of electromotive force in the exciter-circuit 10, in which is included the booster-field 11. The increase of current in motor field-coil 13', said field being differentially wound, as described, results in the weakening of the said field and a consequent speeding up the motor, thereby resulting in increased speed of the exciter-armature 9, causing an additional increase of electromotive force in the exciter-circuit 10 and booster-field 11. The increased intensity of booster-field 11 causes a booster electromotive force in such a direction as to be in series with the battery and cause it to discharge.

Upon a decrease in the load in the consumption-circuit a reverse action takes place, the motor speed falls, and the field strength of the exciter decreases, with the result that the exciter-voltage is less than the bus-bar voltage and there is a current flowing in booster-coil 11 which causes the booster to generate electromotive force in such a direction as to be in series with the bus-bars, causing the battery to charge.

In the system shown in Fig. 2 I have arranged the motor field-coil 13' in series with the exciter armature-circuit instead of in series with the main generators, as in Fig. 1. Said motor field-coil 13' is therefore responsive to electrical conditions in the circuit 10 of the exciter. In the system as thus arranged, the conditions being similar to that of the system shown in Fig. 1—that is, the exciter-voltage being equal and opposite to that of the bus-bars and the motor field-windings being differentially arranged—any increase in load in the consumption-circuit results in an increased current through exciter field-coil 13, building up the exciter-field and causing the exciter to generate an electromotive force greater than that of the bus-bars. The current thus generated traverses the motor field-coil 13', reducing its field and causing the motor speed to increase, thereby increasing the speed of the exciter-armature and generating a further increase of electromotive force in the exciter-circuit and booster-field 11. The booster is thus caused to generate an electromotive force in series with the battery, causing the same to discharge. Upon a decrease of load the reverse conditions would, it is apparent, result in reverse action on part of the regulating devices. It will thus be seen that my invention provides a self-regulating system in which all parts of the auxiliary devices are made responsive to the varying conditions in the consumption-circuit and the battery and booster are rendered quickly responsive to load changes.

Having thus described my invention, the following is what I claim as new therein and desire to secure by Letters Patent:

1. A self-regulating system of current-distribution comprising a generator, storage battery and booster, an exciter for the booster-field, and means responsive to load changes to operate said exciter.

2. A self-regulating system of current-distribution comprising a generator, storage battery and booster, an exciter for the booster-field responsive to load changes, and means also responsive to load changes to operate said exciter.

3. A self-regulating system of current-distribution comprising a generator, a storage battery and a booster in series with the battery, an auxiliary generator in series with the booster-field, a motor for said auxiliary generator, said motor responsive to load changes.

4. A self-regulating system of current-distribution comprising a generator, a storage battery and a booster in series with the battery, an auxiliary generator responsive to load changes and in series with the booster-field, a motor for said auxiliary generator, said motor responsive to load changes.

5. A self-regulating system of current-distribution comprising a generator, a storage battery and a booster in series with the battery, an auxiliary generator in series with the booster-field, and having its field in series with the load, a motor for said auxiliary generator, said motor responsive to load changes.

6. A self-regulating system of current-distribution comprising a generator, a storage battery and a booster in series with the battery, an auxiliary generator connected across the consumption-circuit and in series with the booster-field, a motor for said auxiliary generator, said motor responsive to load changes.

7. In a self-regulating system of electrical distribution, the combination of a generator, a storage battery, a booster, an auxiliary generator responsive to load changes to energize the booster-field, a motor having a driving connection with said auxiliary generator and having its field responsive to changes in the auxiliary-generator circuit.

8. In a self-regulating system of electrical distribution, the combination of a generator, a storage battery, a booster, a consumption-circuit, an auxiliary generator responsive to load changes to energize the booster-field, a motor for said auxiliary generator, and connections between the motor and auxiliary generator whereby the speed of the motor varies as the field intensity of the auxiliary generator.

9. In a self-regulating system of electrical distribution, the combination of a generator, a storage battery, a booster, a consumption-circuit, an auxiliary generator responsive to load changes to energize the booster-field, a motor for said auxiliary generator connected across the consumption-circuit, and connections between the motor and auxiliary generator whereby the speed of the motor varies as the field intensity of the auxiliary generator.

10. In a self-regulating system of electrical distribution, the combination of a generator, a storage battery, a booster, a consumption-circuit, an auxiliary generator responsive to load changes to energize the booster-field, a motor for said auxiliary generator connected across the consumption-circuit, said motor having differential field-windings responsive to load changes and arranged to increase the motor speed on increase of load, and connections between the motor and auxiliary generator whereby the speed of the motor varies as the field intensity of the auxiliary generator.

ALBERT S. HUBBARD.

Witnesses:
EDWARD LYNDON,
J. GREEN.